Feb. 13, 1923.
T. E. MARTIN,
PUMP.
FILED MAR. 29, 1920.
1,444,880.
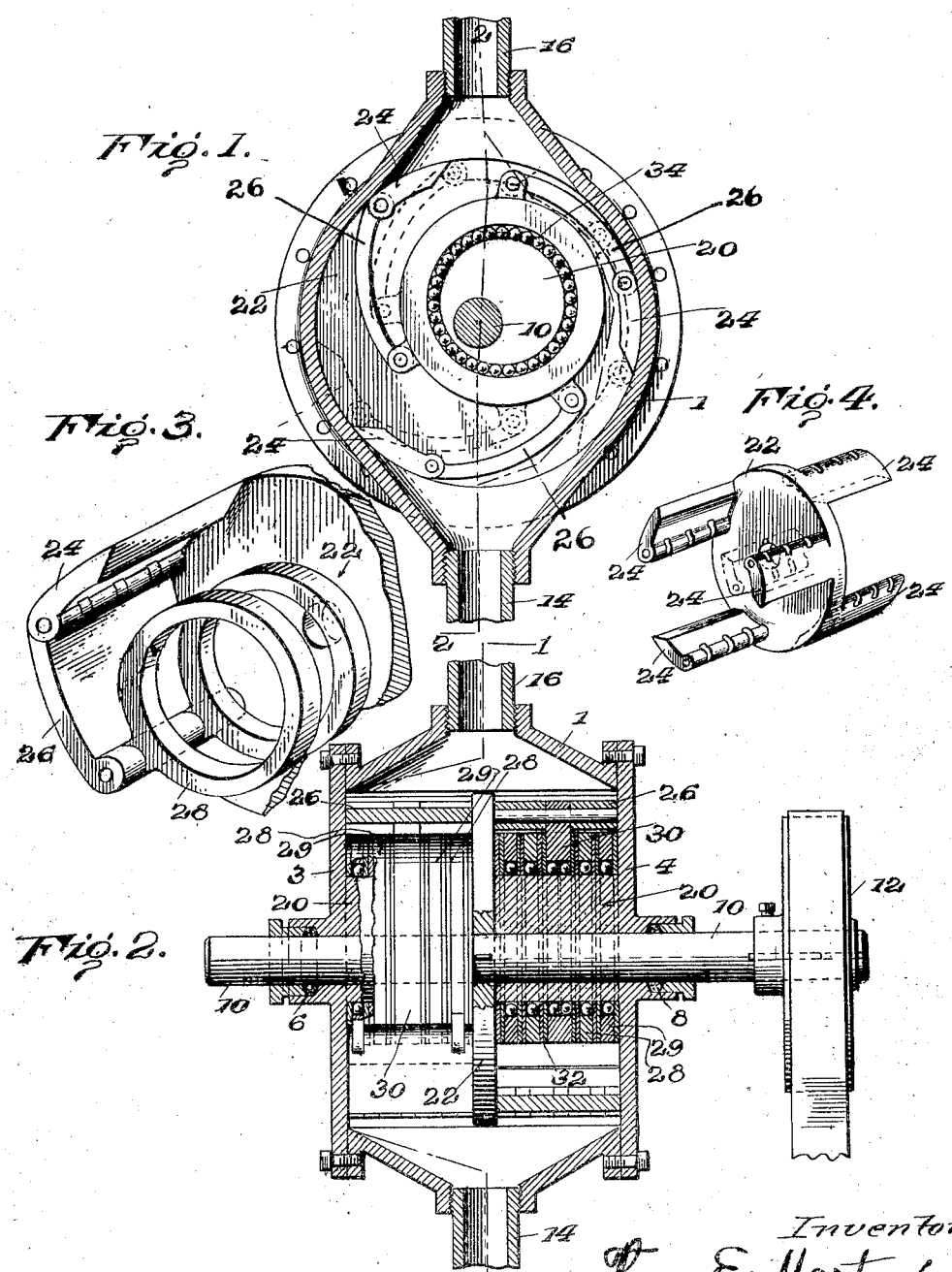

Patented Feb. 13, 1923.

1,444,880

UNITED STATES PATENT OFFICE.

THOMAS E. MARTIN, OF BUFFALO, NEW YORK.

PUMP.

Application filed March 29, 1920. Serial No. 369,601.

*To all whom it may concern:*

Be it known that I, THOMAS E. MARTIN, a citizen of the United States of America, and a resident of Buffalo, in the county of Erie and State of New York, have invented certain new and useful Improvements in Pumps, of which the following is a specification.

This invention relates to an improvement in pumps adapted to pump air, water or any other material, the object of the invention being a pump which will work with little friction, and which will therefore be easy of operation and of great durability.

The invention consists of the pump shown in its preferable embodiment in the drawings accompanying and forming part hereof and hereinafter described and claimed.

In the said drawings:

Figure 1 is a vertical central section of a pump constructed in accordance with my invention.

Figure 2 is a vertical section at right angles to that shown in Figure 1.

Figure 3 is a perspective detail.

Figure 4 is a perspective view of a disk.

Referring now to the details of the drawings by numerals: 1 designates a casing closed at opposite ends by heads 3 and 4 having stuffing boxes 6 and 8 through which passes the driving shaft 10 to which power may be applied as by a pulley 12. The casing 1 is supplied with an inlet 14 and an outlet 16.

Each of the heads 3 and 4 is provided with an internal hub as 20 within which the aforesaid shaft 10 rotates. Said hubs 20 are spaced apart at the center to receive a disk 22 which is keyed to and revolves with said shaft 10 between said hubs 20.

This disk has formed integral therewith a plurality of arms 24, as shown in Figure 4, the drawing showing three such arms on each side of said disk, said arms extending from the disk to the cylinder heads. It will therefore be understood that said arms must rotate with said disk, and to this end their outer surfaces are formed on an arc of the same diameter as that of the casing 10' whereby friction will be decreased and the arms more easily moved around the casing as said shaft 10 and the disk 22 rotate within said casing.

To each of said arms 24 is hinged a curved wing 26 which in turn is supported by a ring or rings rotatable upon the hubs 20. There are preferably five rings on each side of the disk 22, two of these rings 28, 28 being connected to one wing, two others (29, 29) to another wing, and one central wider ring 30 connected to the third wing, these rings being preferably spaced by thinner rings 32. If desired anti-friction bearings 34 may be provided between said rings 28 to 30 and the hubs 20. It will thus be seen that each arm 24 and its wing 26 forms a pocket for the material to be pumped as said parts are rotated within the casing, the arms and wings gathering the material in at the bottom of its movement as shown in Figure 1 and discharging it at the top, the wings 26 drawing in between the rings 28—30 and the right hand side of the casing 1 as shown in Figure 1.

I also desire to call attention to the fact that the wings 26 are also formed on an arc of the same curvature as that of the interior of the casing, so that said wings will snugly fit against said casing on the right side thereof as viewed in Figure 1, and form an effectual seal.

From the foregoing and the accompanying drawing, it will be seen that I have constructed a very simple pump which will work with little friction, which will be easy of operation and very durable in use.

What I claim as my invention is:

1. In a device of the character described, a casing closed at opposite ends by heads, and having an inlet and outlet, each head provided with an internal hub eccentrically located thereon, in combination with a shaft extending concentrically through the heads and eccentrically through the hubs, a disk keyed on the shaft between the hubs, the disk having outwardly projecting arms fixed on opposite sides thereof, said arms in staggered relation on the opposite sides of the disk, the outer surfaces of these arms formed on an arc of the same diameter as the internal bore of the casing, wings hinged to these arms, rings carried by the wings in position to surround the hubs, these rings spaced apart on the different wings approximately the width of a ring, and spacing rings filling the spaces between the rings carried by the wings.

2. In a casing of the character described, the combination of a casing having an inlet and outlet, a shaft, a disk rotatable therewith and having on opposite sides thereof arms rotatable therewith and formed on an arc of the same diameter as that of the casing, said arms on one side of said disk being in staggered relation to those upon the opposite side of the disk.

3. In a device of the character described, the combination of a casing having an inlet and outlet and formed with interior hubs, a shaft, a disk rotatable with said shaft, arms formed on and rotatable with said disk, rings rotatable on said hubs, and wings hinged to said arms and to the said rings.

4. In a device of the character described, the combination of a casing having an inlet and outlet and formed with interior hubs, a shaft, a disk rotatable with said shaft, arms formed on and rotatable with said disk, rings rotatable on said hubs, and wings hinged to said arms and to the said rings, said arms being formed on an arc of the same diameter as that of the casing.

5. In a device of the character described, the combination of a casing having inlet and outlet and interior hubs, a shaft rotatable in said casing within said hubs, a disk rotatable with said shaft and located between said hubs, arms formed on and rotatable with said disk and located upon opposite sides thereof, rings rotatable upon the hubs of said casing upon opposite sides of said disk, and wings hinged to said arms and to said rings.

6. In a device of the character described, the combination of a casing having inlet and outlet and interior hubs, a shaft rotatable in said casing within said hubs, a disk rotatable with said shaft and located between said hubs, arms formed on and rotatable with said disk and located upon opposite sides thereof, rings rotatable upon the hubs of said casing upon opposite sides of said disk, and wings hinged to said arms and to said rings, said arms being formed on an arc of the same diameter as that of the casing.

7. In a device of the character described, the combination of a casing having an inlet and outlet and formed with interior hubs, a shaft, a disk rotatable with said shaft, arms formed on and rotatable with said disk, rings rotatable on said hubs, and wings hinged to said arms and the said rings, said arms and said wings being formed on an arc of the same diameter as that of the casing.

8. In a device of the character described, the combination of a casing having inlet and outlet and interior hubs, a shaft rotatable in said casing within said hubs, a disk rotatable with said shaft and located between said hubs, arms formed on and rotatable with said disk and located upon opposite sides thereof, rings rotatable upon the hubs of said casing upon opposite sides of said disk, and wings hinged to said arms and to said rings, said arms and said wings being formed on an arc of the same diameter as that of the casing.

9. The combination with a casing having an inlet and an outlet, and provided with heads securely bolted thereto, said heads having hubs eccentric to the inner wall of the casing, and a shaft extending through the centers of the heads and eccentric with respect to the hubs, a disk interposed between the hubs and keyed to the shaft, arms secured to the disk and extending in opposite directions, wings hinged to the arms, and rings hinged to the wings and surrounding the eccentric hubs with bearings between the rings and hubs.

In testimony whereof I affix my signature in presence of two witnesses.

THOMAS E. MARTIN.

Witnesses:
 JOHN L. FLETCHER,
 H. SILMIRIE.